US009906051B2

(12) United States Patent
Chang et al.

(10) Patent No.: US 9,906,051 B2
(45) Date of Patent: Feb. 27, 2018

(54) POWER SUPPLY SYSTEM USING ENERGY STORAGE CELL

(71) Applicant: CHANGS ASCENDING ENTERPRISE CO., LTD., Taichung (TW)

(72) Inventors: Tsun-Yu Chang, Taichung (TW); Chun-Chieh Chang, Taichung (TW)

(73) Assignee: CHANGS ASCENDING ENTERPRISE CO., LTD., Taichung (TW)

( * ) Notice: Subject to any disclaimer, the term of this patent is extended or adjusted under 35 U.S.C. 154(b) by 0 days.

(21) Appl. No.: 14/779,091

(22) PCT Filed: Jul. 1, 2015

(86) PCT No.: PCT/CN2015/083058
§ 371 (c)(1),
(2) Date: Sep. 22, 2015

(87) PCT Pub. No.: WO2017/000275
PCT Pub. Date: Jan. 5, 2017

(65) Prior Publication Data
US 2017/0170667 A1 Jun. 15, 2017

(51) Int. Cl.
*H02J 7/00* (2006.01)
(52) U.S. Cl.
CPC .......... *H02J 7/0014* (2013.01); *H02J 7/0021* (2013.01)
(58) Field of Classification Search
CPC .............................. H02J 7/0014; H02J 7/0021

USPC ......................................... 320/127, 132–136
See application file for complete search history.

(56) References Cited

U.S. PATENT DOCUMENTS

| 6,127,621 A * | 10/2000 | Simburger ................ H02J 3/38 136/246 |
| 2010/0164436 A1* | 7/2010 | Lampe-Onnerud H01M 10/0525 320/134 |
| 2011/0193518 A1* | 8/2011 | Wright .................. H01M 10/44 320/101 |

(Continued)

FOREIGN PATENT DOCUMENTS

| CN | 103119828 A | 5/2013 |
| CN | 204230982 U | 3/2015 |

(Continued)

*Primary Examiner* — Stacy Whitmore
(74) *Attorney, Agent, or Firm* — Muncy, Geissler, Olds & Lowe, P.C.

(57) ABSTRACT

A power supply system using an energy storage cell includes at least one lithium cell module; a voltage balance device, received and built in the lithium cell module, for performing voltage balance; and a cell module voltage monitoring device, disposed between a load and the lithium cell module, for monitoring and controlling working voltage ranges of all the lithium cell modules. The voltage balance device built in each lithium cell module performs charging correction on a lithium cell unit in which a capacitance difference is caused by a fabrication process or caused subsequently, to prevent overcharge damage of the lithium cell unit caused by the capacitance difference. The cell module voltage monitoring device is provided on an external line, and only a correct total charge voltage needs to be provided to charge the lithium cell module.

11 Claims, 5 Drawing Sheets

(56) References Cited

U.S. PATENT DOCUMENTS

| | | | |
|---|---|---|---|
| 2014/0312850 A1* | 10/2014 | Song ................ | H02J 7/0014 320/134 |
| 2016/0099586 A1* | 4/2016 | Shiraishi ........... | H02J 7/0016 320/118 |
| 2016/0204625 A1* | 7/2016 | Josephs ............ | H02J 7/007 320/139 |

FOREIGN PATENT DOCUMENTS

| | | |
|---|---|---|
| CN | 204376468 U | 6/2015 |
| WO | WO2014/151178 A2 | 9/2014 |

* cited by examiner

POWER SUPPLY SYSTEM USING ENERGY STORAGE CELL

BACKGROUND

Technical Field

The present invention relates to a power supply system using an energy storage cell, and more particularly to an energy storage power supply system using a lithium cell.

Related Art

With application of cloud computation and popularization of network storage devices, enterprises and small offices/home offices (SOHOs) have increasing demands for an uninterruptible power supply (UPS). However, an internal power source usually used by a current UPS is a lead-acid cell, which does not meet the developing trend of relevant product technologies. Besides, due to product advantages of a lithium cell, the lithium cell may completely replace the lead-acid cell in the future, and become an internal power source of a new generation UPS.

The UPS is a device which temporarily supplies power for a personal computer and peripherals thereof by using an internal cell as a power source when problems such as power off or change of a power source occur. During a UPS power supply period, the system is terminated to ensure that the system operation ends securely. The UPS is generally provided for SOHOs or enterprises, to enable industrial facilities in the production process such as online server products and electronic apparatuses to be operated stably. Especially, as application of cloud computation is increasingly popularized, many enterprises employ an array-type magnetic disk device or a network attached storage (NAS) as a main storage medium, and have increasing demands for the UPS, which prevents data loss caused by transient power unsteadiness and avoids massive enterprise loss.

The global developing trend of the UPS technology can generally be divided into three parts, namely, energy saving and environmental protection, high efficiency and high reliability, and digitalization, intellectualization, and networking. Therefore, the current and future design focuses of the UPS lie in high efficiency, energy saving, and environment-friendly materials, high reliability, and easy maintenance and management. The internal power source of the current UPS is mainly a lead-acid cell, but the property and characteristics of the lead-acid cell are against the overall developing trend of the UPS technology, and meanwhile, with rise of the production cost of a lead polar plate and the lead-acid cell, it is an inevitable trend that the lithium cell replaces the lead-acid cell to become the internal power source of the UPS.

Compared with the lead-acid cell, the lithium cell has the following advantages which meet the developing trend of the current UPS technology, and is thus more suitable for the UPS.

1. The depth of discharge exceeds 95%, so the discharge time is long, which ensures that systems such as server products complete working before the UPS finishes discharging.

2. A high-rate discharge current is supported, which is suitable for high power application scenarios.

3. The discharge voltage is stable, which avoids facility failure due to unstable voltage.

4. The self-discharge rate is low. The self-discharge rate of the lithium cell is only 1% to 1.5% per month, which is far superior to that of the lead-acid cell (the self-discharge rate thereof is 30%). In scenarios where the power is stable, an uninterruptible power system does not need to perform trickling charge of the cell at any time for maintenance, thereby achieving the purpose of energy saving.

5. The service life is long. The lithium-iron cell can still maintain 75% of the original capacity after being charged and discharged for 3,000 times. The service life of the lithium-iron cell is ten times that of the lead-acid cell, and the lithium-iron cell is maintenance-free, so the maintenance cost of the cell can be largely reduced.

6. The security is high, and there is no risk of acid leakage.

7. The raw material of the lithium cell is an environment-friendly material, which contains no heavy metal or high contamination substances.

Due to their different characteristics, the lithium cell and the lead-acid cell have different charging curves and loops, and the charging apparatuses have different specifications in accordance with UPSs of different brands, so it is a huge project to replace the lead-acid cell with the lithium cell for an existing UPS client each year. Taking a conventional cell system for example, the cell system is formed of several cell modules connected in series. Each cell module has a built-in cell set voltage monitoring function, used for monitoring voltage of a single cell set (equivalent to voltage of a single cell). When the voltage of a random cell set is over high or over low, the cell module sends a signal indicating overcharge or low voltage. However, the transmission specification of the monitoring signal may cause problems in reliability and compatibility with an existing UPS system (taking a UPS as an example). Therefore, the present invention is directed to facilitate replacement of an existing lead-acid cell with a lithium cell module and make the lithium cell module compatible with an existing UPS system.

SUMMARY

Therefore, to solve the problem in the prior art that it is inconvenient to replace a lead-acid cell with a lithium cell, in the present invention, a voltage balance device built in a lithium cell module performs charging correction on a cell unit in which a capacitance difference is caused by a lithium cell core in a fabrication process or caused subsequently. A cell module voltage monitoring device is provided on an external line to control a working voltage range of the lithium cell module, and the lithium cell module is effectively managed and controlled through the voltage balance device in the cell module and the external cell module voltage monitoring device. Therefore, complicated external control devices and wirings are not needed, and only a correct total charge voltage and a correct total discharge voltage of a cell system need to be provided to charge and discharge the cell module.

To achieve the above objective, the present invention provides a power supply system using an energy storage cell. The system is applied for supplying power to a load, and mainly includes: at least one lithium cell module, the lithium cell module including several lithium cell units, and the lithium cell units being connected in parallel and/or connected in series to form the lithium cell module; a voltage balance device, received and built in each lithium cell module, the voltage balance device being respectively coupled to the lithium cell units in the lithium cell module and used for performing voltage balance on each lithium cell unit; and a cell module voltage monitoring device, disposed between the load and the lithium cell module, and used for monitoring and controlling a working voltage range of the lithium cell module, to monitor and learn about the state of health (SOH) of the cell power supply system in a manner of total voltage control of a single module.

The lithium cell unit is a lithium-iron cell or a lithium ternary cell. When the voltage of the lithium cell unit in the lithium cell module exceeds a preset voltage value, the voltage balance device is triggered to discharge the lithium cell unit by a set time length, or discharge the lithium cell unit at a set time point and by a set number of times, thereby achieving voltage balance of each lithium cell unit.

In the implementation, the system further includes: a direct-current bus, electrically connected to the load; several lithium cell modules, connected in parallel to the direct-current bus, each lithium cell module including several lithium cell units, and the lithium cell units being connected in parallel and/or connected in series to form the lithium cell module; a voltage balance device, received and built in each lithium cell module, the voltage balance device being respectively coupled to the lithium cell units in the lithium cell module and used for performing voltage balance on each lithium cell unit; and several cell module voltage monitoring devices, respectively disposed between the direct-current bus and each lithium cell module, and used for monitoring a working voltage range of the lithium cell module, to monitor and learn about the SOH of the cell power supply system in a manner of total voltage control of a single module.

The system further includes at least one energy power generation system and/or a commercial power, which is fed into the direct-current bus in a manner of parallel connection. The energy power generation system is a solar power generation system, a wind power generation system, or a power generator system.

The present invention has the following advantages. The voltage balance device built in each lithium cell module performs charging correction on a cell unit in which a capacitance difference is caused by a lithium cell core in a fabrication process or caused subsequently, to prevent overcharge damage of the lithium cell unit caused by the capacitance difference. The cell module voltage monitoring device is provided on an external line to monitor a working voltage range of the lithium cell module connected thereto. Therefore, complicated external control devices and wirings are not needed, and only a correct total charge voltage needs to be provided to charge the lithium cell module.

Moreover, in a charging process of the cell system, if the voltage of any cell module exceeds a preset overcharge voltage, it indicates that the cell module needs to be repaired (replaced), and thus the SOH of the cell module is monitored and learned about in this method. The external voltage control is implemented by most of the existing UPSs or monitoring apparatuses using a lead-acid cell system. Therefore, the system can solve the problem in the prior art that it is inconvenient to replace a lead-acid cell with a lithium cell.

BRIEF DESCRIPTION OF THE DRAWINGS

The disclosure will become more fully understood from the detailed description given herein below for illustration only, and thus are not limitative of the disclosure, and wherein.

DETAILED DESCRIPTION

Embodiments are provided below to illustrate in detail the content and technical solutions of the present invention. However, it should be understood that these embodiments are only illustrative, and are not intended to limit the scope of the present invention.

Figure 1:
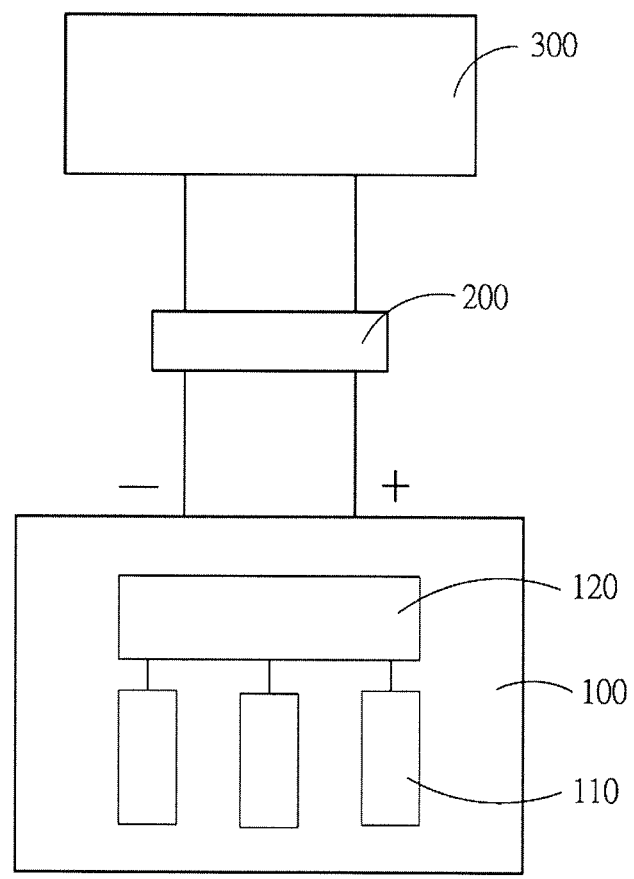
FIG. 1 is a schematic view 1 of a power supply system using an energy storage cell according to the present invention.
Figure 2:
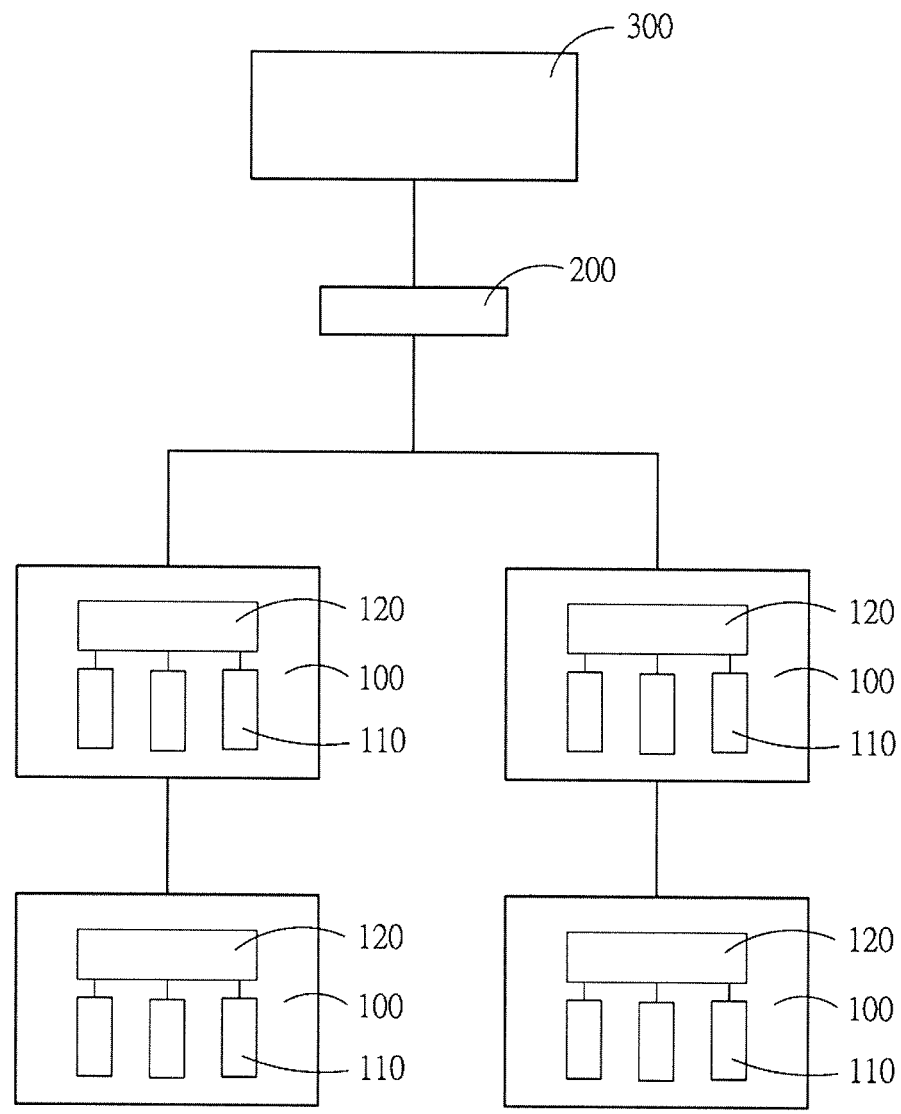
FIG. 2 is a schematic view 2 of the power supply system using the energy storage cell according to the present invention.

Referring to FIG. 1 and FIG. 2, the present invention provides a power supply system using an energy storage cell. The system is applied for supplying power to a load 300, and mainly includes at least one lithium cell module 100. As shown in FIG. 1, a single lithium cell module 100 supplies power to the load 300; or as shown in FIG. 2, multiple lithium cell modules 100 are connected in parallel and/or connected in series to together supply power to the load 300.

Each lithium cell module 100 includes several lithium cell units 110. The lithium cell units 110 are lithium-iron cells or lithium ternary cells, and are connected in parallel and/or connected in series to form the lithium cell module 100. The quantity of the lithium cell units 110 in the lithium cell module 100 is determined according to the voltage value and the current value required by the load 300, and the lithium cell units 110 form the desired lithium cell module 100 in a manner of parallel connection, serial connection, parallel connection-serial connection, or serial connection-parallel connection.

Further, a voltage balance device 120 is received and built in each lithium cell module 100. The voltage balance device 100 is respectively coupled to the lithium cell units 110 in the lithium cell module 100, and used for performing voltage balance on each lithium cell unit 110. The voltage balance device 120 generally implemented as a printed circuit board (PCB) performs a balance charging or discharging mechanism on each lithium cell unit 110. When the voltage of the lithium cell unit 110 in the lithium cell module 100 exceeds a preset voltage value, the voltage balance device 120 is triggered to discharge the lithium cell unit 110 by a set time length (for example, 1 hr), or discharge the lithium cell unit 110 at a set time point and by a set number of times (for example, continuously or indirectly discharging once per second for 3,600 times), to achieve voltage balance of each lithium cell unit 110. The discharge current depends on the voltage of the cell unit and the impedance of resistors connected in parallel with the cell unit.

For example, assume that the lithium cell units 110 are four cell units connected in series. When the voltage of one cell unit exceeds a set voltage (for example, 3.5 V of a lithium-iron cell), the current passes through a resistor, and the capacitance is lowered by certain amount (from 0.1% to 10% of the total capacitance) in a bypass manner. As the reduce of the capacitance may cause rise of the voltage of other cell units, some cell units are discharged by certain capacitance in turn, to achieve the purpose of cell balance. The method of discharging by certain capacitance in a bypass manner can be performed by a set time length or at a set time point and by a set number of times. Therefore, when the cell units are triggered for discharging in turn during a charging process once (or several times), overcharge of the cell (for example, 4 V of a lithium-iron cell) is avoided in the next charging process. Besides, the cell balance manner is irrelevant to the magnitude of the charge current.

As charging of the lithium cell module 100 is controlled by the total voltage, a cell module voltage monitoring device 200 is disposed between the load 300 and the lithium cell module 100 (shown in FIG. 1), or the cell module voltage monitoring device 200 is disposed between the load 300 and all the lithium cell modules 100 (shown in FIG. 2), and used for monitoring working voltage ranges of all the lithium cell modules 100 connected to the cell module voltage monitoring device 200, to monitor and learn about the SOH of the cell power supply system in a manner of total voltage control of a single module.

Figure 3:
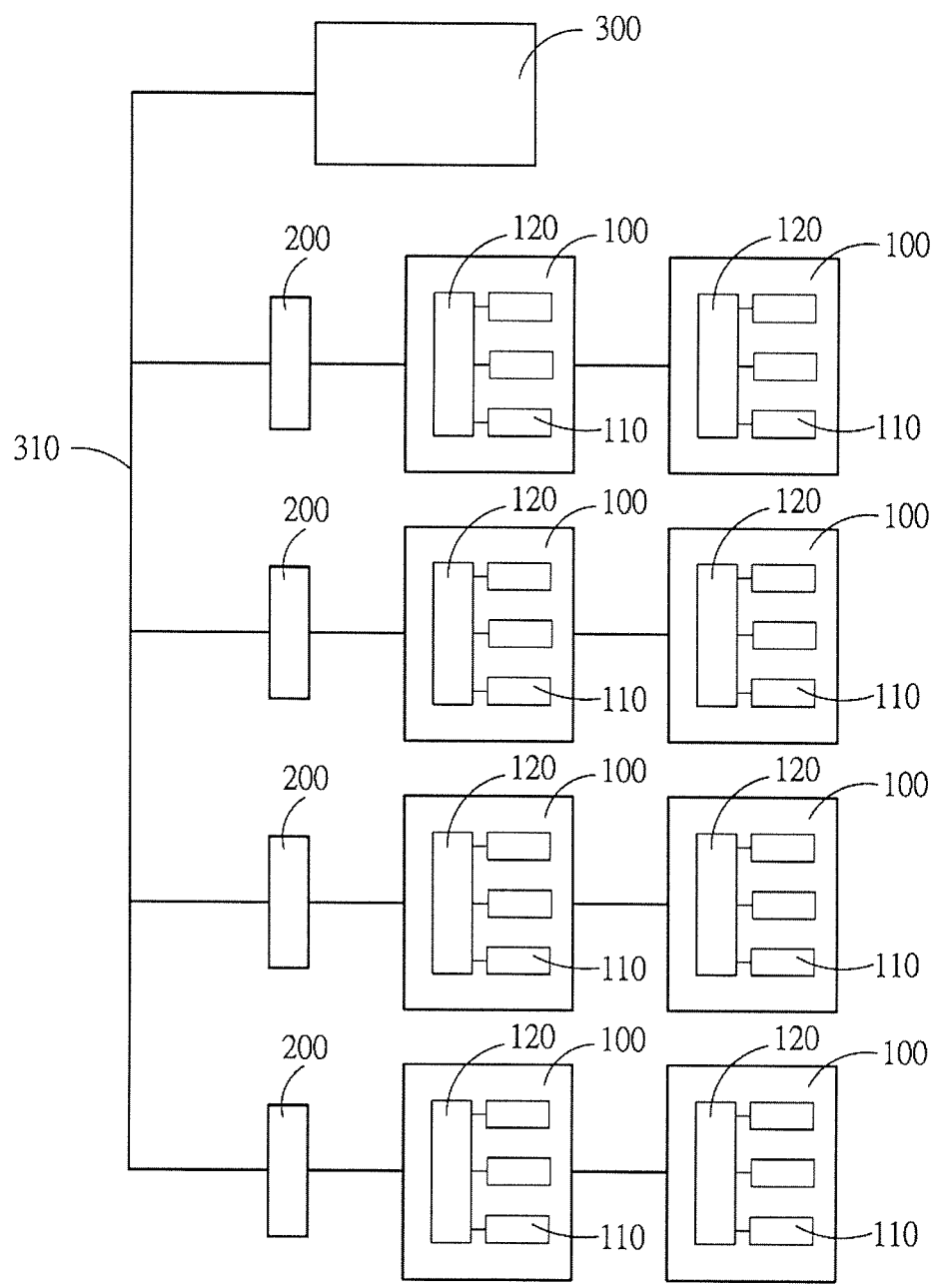
FIG. 3 is a schematic view 3 of the power supply system using the energy storage cell according to the present invention.

Further referring to FIG. 3, in the implementation, the system further includes a direct-current bus 310 electrically connected to the load 300. Several lithium cell modules 100 are connected in parallel to the direct-current bus 310, and each lithium cell module 100 includes several lithium cell units 110. The lithium cell units 110 are lithium-iron cells or lithium ternary cells, and are connected in parallel and/or connected in series to form the lithium cell module 100. The quantity of the lithium cell units 110 in the lithium cell module 100 is determined according to the voltage value and the current value required by the load 300, and the lithium cell units 110 form the desired lithium cell module 100 in a manner of parallel connection, serial connection, parallel connection-serial connection, or serial connection-parallel connection. The quantity of the lithium cell modules 100 connected in series is determined according to the working voltage required by the load 300. FIG. 3 shows two lithium cell modules 100 connected in series as an example for illustration.

A voltage balance device 120 is received and built in each lithium cell module 100. The voltage balance device 120 is respectively coupled to the lithium cell units 110 in the lithium cell module 100, and used for performing voltage balance on each lithium cell unit 110. Through voltage control of the voltage balance device 120, the overcharge problem may not occur to damage the lithium cell modules 100.

Several cell module voltage monitoring devices 200 are respectively disposed between the direct-current bus 310 and each lithium cell module 100, and used for monitoring a working voltage range of the lithium cell module 100, to monitor and learn about the SOH of the cell power supply system in a manner of total voltage control of a single module.

Figure 4:
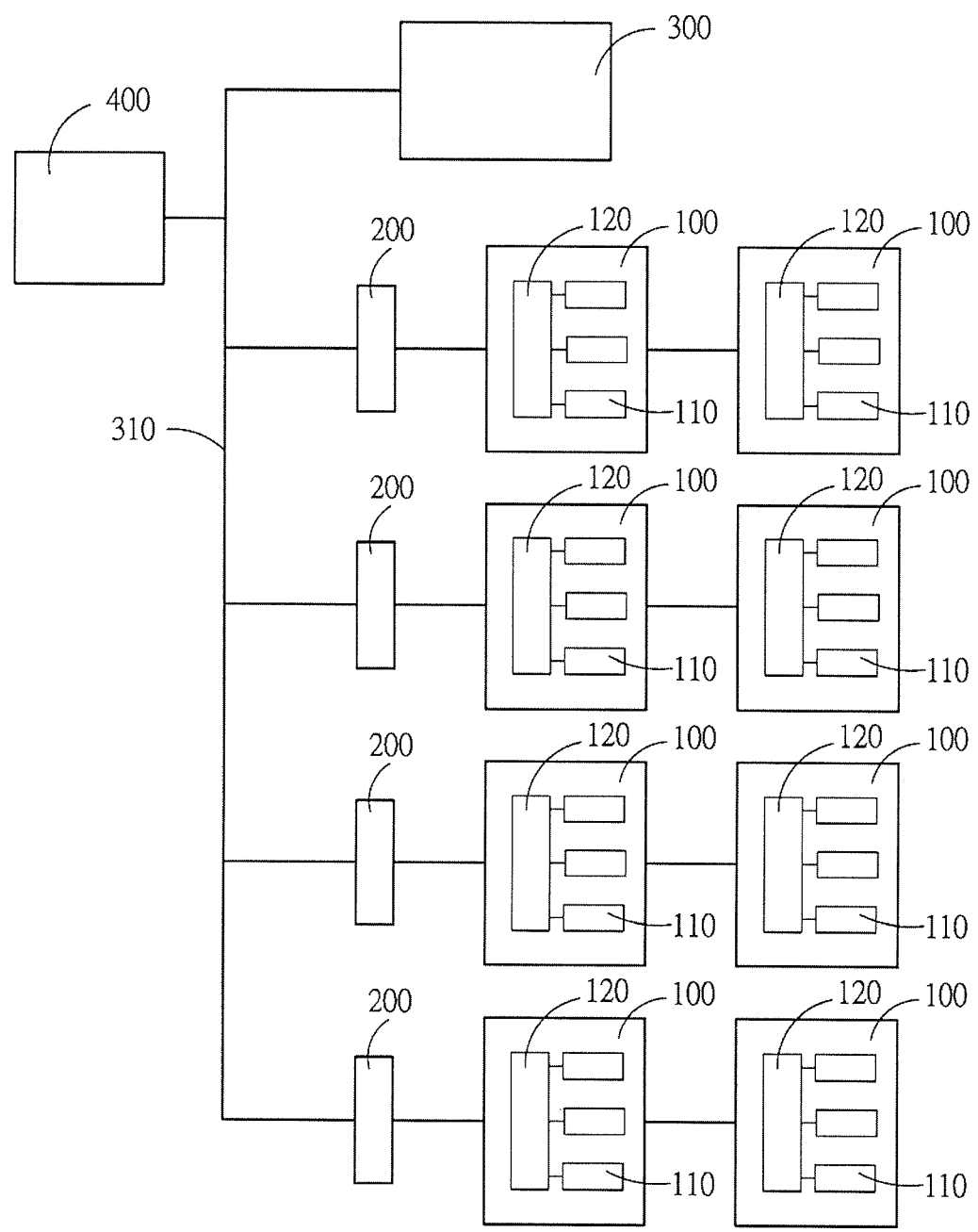
FIG. 4 is a schematic view of configuration of an energy power generation system according to the present invention.
Figure 5:
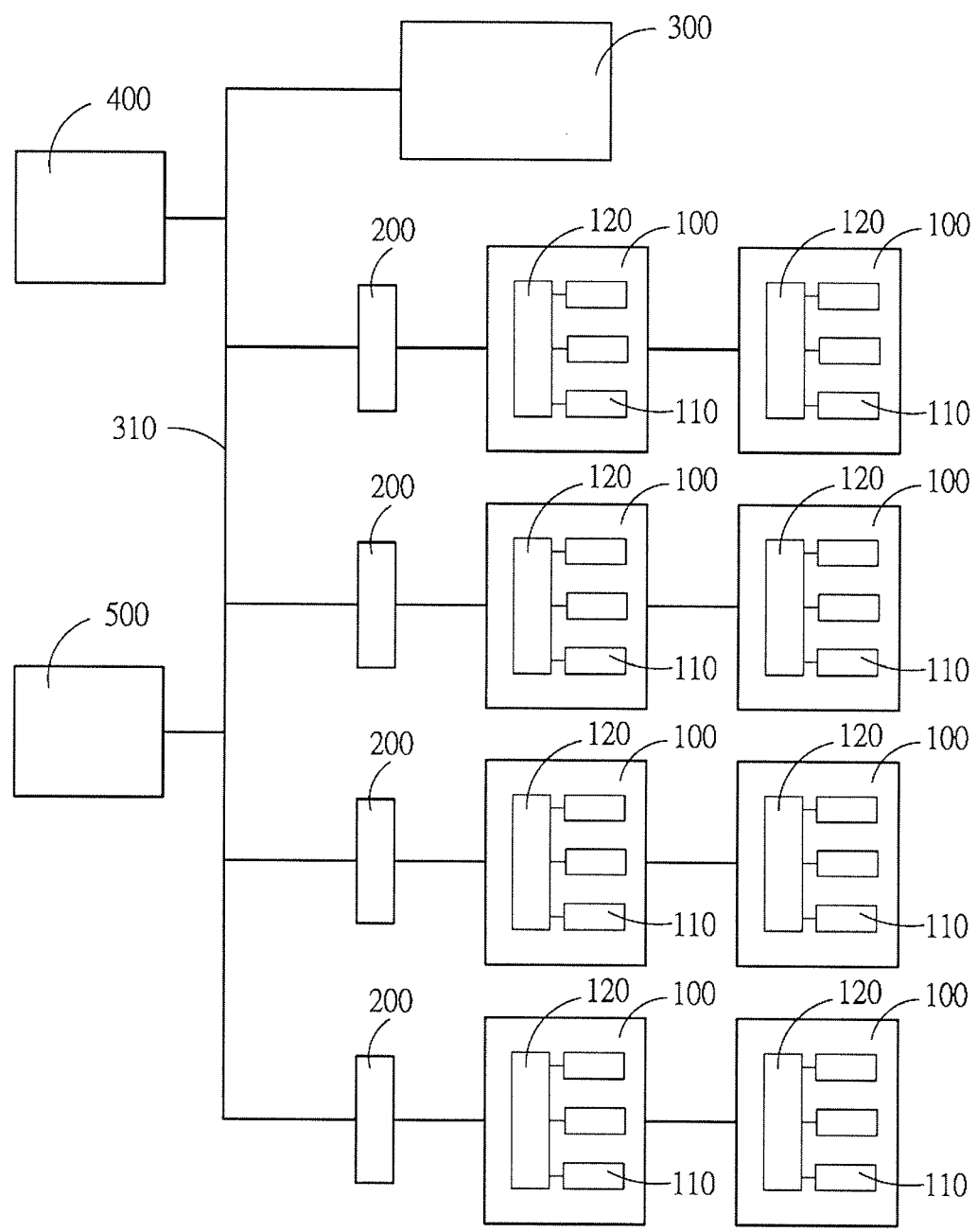
FIG. 5 is a schematic view of configuration of an energy power generation system and a commercial power according to the present invention.

Further referring to FIG. 4 and FIG. 5, in the implementation, the system further includes at least one current source, an energy power generation system 400, and/or a commercial power 500, which is fed into the direct-current bus 310 in a manner of parallel connection. The energy power generation system 400 is preferably a renewable energy power generation system, for example, a solar power generation system and/or a wind power generation system, or various power generator systems. The current source (the energy power generation system 400 or the commercial power 500) is mainly fed into the lithium cell modules 100; or the current source can be directly fed into the load 300, which depends on setting of a power control system.

In the implementation, in a charging process of the cell system, if the voltage of any lithium cell module 100 exceeds a preset overcharge voltage, it indicates that the lithium cell module 100 needs to be repaired (replaced), and thus the SOH of the lithium cell module 100 is monitored and learned about in this method. The external voltage control is implemented by most of the existing UPSs or monitoring apparatuses using a lead-acid cell system. Therefore, the system can solve the problem in the prior art that it is inconvenient to replace a lead-acid cell with a lithium cell.

In the actual application, a standard cell energy storage system (UPS), which is generally a cell system product formed by cell modules of voltage plateaus of 12 V, 24 V, 48 V, and 72 V (the total voltage is an integer multiple of the voltage of the cell modules), is taken as an example for illustration. The cell module voltage monitoring device 200 controls the charge voltage within 10 V to 14.5 V, 20 V to 29 V, 40 V to 58 V, and 60 V to 86 V. The voltage balance device 120 built in the lithium cell module 100 prevents overcharge damage of the lithium cell unit 110 caused by a capacitance difference. The lithium cell module 100 of the system can completely replace the lead-acid cell used by the existing UPS system.

Taking the power storage function of the conventional lead-acid cell in a motor vehicle for example, the lithium cell module 100 of the present invention can directly replace the conventional lead-acid cell to achieve the purpose of power storage as well as improved combustion efficiency and prolonged service life (the expected service life may exceed ten years). That is, in normal use, only one lithium cell module 100 needs to be mounted in each automobile (motor vehicle) and does not need to be replaced (a lead-acid cell needs to be replaced every two or three years).

When the automobile (motor vehicle) (the load 300) is started, a storage battery supplies power to actuate a motor and start an engine (the voltage of the lead-acid cell is lower than 12 V). After the automobile is started, a power generator (the power generator outputs a voltage of 13.5 V to 14.5 V) supplies power to all electrical apparatuses in the automobile. When full-load output of the power generator is insufficient for power supply, a standby cell is used for supplement. In the case of low-load output of the power generator, the extra power is supplied to charge the cell to full load (the lithium cell module 100 can be fully charged when the voltage is higher than 13.5 V). When the storage battery is full and the load of the electrical apparatuses is low, a voltage regulator of the power generator may reduce the magnetic field intensity of a rotor, and the power generation amount is reduced to maintain set voltage output. When the voltage of the storage battery is insufficient and the load of the electrical apparatuses is increased, the magnetic field intensity of the power generator is increasingly enhanced to raise the power generation amount and maintain the set voltage output.

The highest voltage output of the power generator of the automobile (motor vehicle) is 14.5 V, and the voltage of the conventional lead-acid cell is 12.0 V when fully charged (the voltage of the conventional lead-acid cell having a service life of two years may be 9.0 V and the cell cannot be fully charged; therefore, the automobile usually fails to be started, especially in winter). The lithium cell module 100 is, for example, a lithium-iron cell, and the voltage of the lithium-iron cell is 13.2 V when fully charged, which is lower than the highest voltage of the power generator and does not reduce the service life of the parts of the automobile, because stable voltage helps to prolong the service life of the electrical apparatuses.

In the present invention, the voltage balance device 120 built in the lithium cell module 100 performs charging correction on the lithium cell unit 110 in which a capacitance difference is caused by a fabrication process or caused subsequently, to prevent overcharge damage of the lithium cell unit 110 caused by the capacitance difference. The cell module voltage monitoring device 200 is provided on an external line to monitor the working voltage range of the lithium cell module 100. The voltage balance device 120 and the cell module voltage monitoring device 200 can effectively balance the voltage of the lithium cell unit 110 in the lithium cell module 100. Therefore, complicated external control devices and wirings are not needed, and only a correct total charge voltage needs to be provided to charge the lithium cell module 100. Specifically for an existing carrier device equipped with a secondary cell, the cell module voltage monitoring device 200 is generally provided, and the system can solve the problem in the prior art that it is inconvenient to replace a lead-acid cell with a lithium cell.

The above description is merely exemplary embodiments of the present invention, which are not intended to limit the scope of the present invention, and all simple equivalent changes and modifications made based on the claims and the specification of the present invention shall fall within the scope of the present invention.

What is claimed is:

1. A power supply system using an energy storage cell, applied for supplying power to a load, and mainly comprising:
    at least one lithium cell module, the lithium cell module comprising several lithium cell units, and the lithium cell units being connected in parallel and/or connected in series to form the lithium cell module;
    a voltage balance device, received and built in each lithium cell module, the voltage balance device being respectively coupled to the lithium cell units in the lithium cell module and used for performing voltage balance on each lithium cell unit; and
    a cell module voltage monitoring device, disposed between the load and the lithium cell module, and used for monitoring a working total voltage range of the lithium cell module, in a charging process of the cell system, if the voltage of any cell module exceeds a preset overcharge voltage, it indicates that the cell module needs to be repaired or replaced, to monitor and learn about the state of health (SOH) of the cell power supply system in a manner of total voltage control of a single module.

2. The power supply system using the energy storage cell according to claim 1, wherein the lithium cell unit is a lithium-iron cell or a lithium ternary cell.

3. The power supply system using the energy storage cell according to claim 1, wherein when the voltage of the lithium cell unit in the lithium cell module exceeds a preset voltage value, the voltage balance device is triggered to discharge the lithium cell unit by a set time length.

4. The power supply system using the energy storage cell according to claim 1, wherein when the voltage of the lithium cell unit in the lithium cell module exceeds a preset voltage value, the voltage balance device is triggered to discharge the lithium cell unit at a set time point and by a set number of times.

5. A power supply system using an energy storage cell, applied for supplying power to a load, and mainly comprising:
    a direct-current bus, electrically connected to the load;
    several lithium cell modules, connected in parallel to the direct-current bus, each lithium cell module comprising several lithium cell units, and the lithium cell units being connected in parallel and/or connected in series to form the lithium cell module;
    a voltage balance device, received and built in each lithium cell module, the voltage balance device being respectively coupled to the lithium cell units in the lithium cell module and used for performing voltage balance on each lithium cell unit; and
    several cell module voltage monitoring devices, respectively disposed between the direct-current bus and each lithium cell module, and used for monitoring a working total voltage range of the lithium cell module, in a charging process of the cell system, if the voltage of any cell module exceeds a preset overcharge voltage, it indicates that the cell module needs to be repaired or replaced, to monitor and learn about the state of health (SOH) of the cell power supply system in a manner of total voltage control of a single module.

6. The power supply system using the energy storage cell according to claim 5, wherein the lithium cell unit is a lithium-iron cell or a lithium ternary cell.

7. The power supply system using the energy storage cell according to claim 5, wherein when the voltage of the lithium cell unit in the lithium cell module exceeds a preset voltage value, the voltage balance device is triggered to discharge the lithium cell unit by a set time length.

8. The power supply system using the energy storage cell according to claim 5, wherein when the voltage of the lithium cell unit in the lithium cell module exceeds a preset voltage value, the voltage balance device is triggered to discharge the lithium cell unit at a set time point and by a set number of times.

9. The power supply system using the energy storage cell according to claim 5, further comprising at least one energy power generation system, the energy power generation system being fed into the direct-current bus in a manner of parallel connection.

10. The power supply system using the energy storage cell according to claim 5, wherein the energy power generation system is a solar power generation system, a wind power generation system, or a power generator system.

11. The power supply system using the energy storage cell according to claim 5, further comprising a commercial power, the commercial power being fed into the direct-current bus in a manner of parallel connection.

* * * * *